June 22, 1926.
G. R. MORRIS
SIGNAL
Filed Feb. 9, 1924
1,589,653
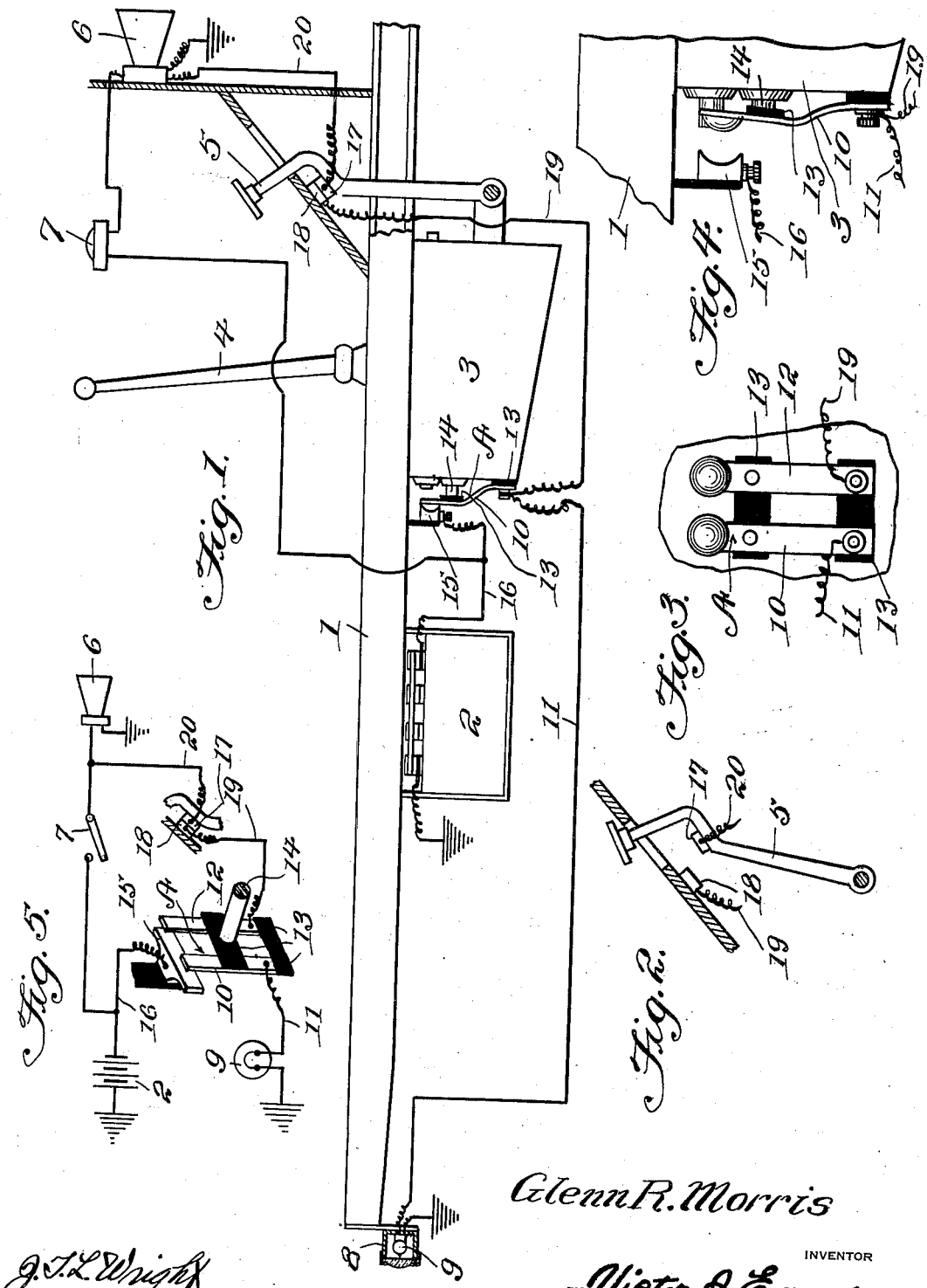

Patented June 22, 1926.

1,589,653

UNITED STATES PATENT OFFICE.

GLENN ROY MORRIS, OF YAKIMA, WASHINGTON, ASSIGNOR OF ONE-HALF TO WALLIS B. WILLIAMS, OF YAKIMA, WASHINGTON.

SIGNAL.

Application filed February 9, 1924. Serial No. 691,755.

This invention relates to signals for motor vehicles, the general object of the invention being to provide means for lighting a lamp and for sounding an alarm when the vehicle is to be reversed.

Another object of the invention is to provide means for closing the circuits to the lamp and alarm when the transmission mechanism has been moved to reverse position.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Figure 1 is a diagrammatic view showing the invention applied to a motor vehicle, and with the switches in closed position.

Figure 2 is a sectional detail view showing the clutch switch in open position.

Figure 3 is a perspective view of the transmission switch.

Figure 4 is a side view of this switch in open position.

Figure 5 is a diagrammatic view of the circuit.

In these views, 1 indicates a portion of the frame of the vehicle, 2 the battery, 3 the casing for the transmission mechanism, 4 the lever for such mechanism, 5 the clutch pedal and 6 the horn of the vehicle, the circuit of which is controlled by the usual switch 7. In carrying out my invention I place a lamp casing 8 at the rear of the vehicle, the lens of which is preferably of green color and I connect the lamp 9 in said casing with one member 10 of a switch A, by the conductor 11, the other member of the switch being shown at 12 and the two members are connected together by the strips 13 of insulating material so that the two members are insulated from each other. The strip 13 is suitably fastened to the rear end of the case 3 and the upper strip 13 is so located that it will be engaged by the shift rod 14 of the transmission mechanism when said rod is moved rearwardly when the parts are moved to reverse position. This movement will cause the members 10 and 12 to engage the stationary part 15 of the switch which is suitably supported from the frame 1 and which is connected by the conductor 16 with the battery 2 of the car. Thus when the transmission mechanism is moved to reverse position to cause the car to move rearwardly, the circuit of the lamp 9 will be closed by the member 10 engaging the part 15 so that the lamp will be lighted and thus the green light will indicate that the vehicle is to be backed.

In order to sound the alarm or horn 6 when the car is being reversed, I place a contact 17 on the clutch pedal 5 and a similar contact 18 on the floor board so that the two contacts will come together when the clutch pedal is in operative position. The contact 18 is connected by the conductor 19 with the switch member 12 and the contact 17 is connected by the conductor 20 with the horn 6 so that when the clutch pedal is in operative position the circuit to the horn will be closed by the contacts 17 and 18 engaging each other and the switch A is closed by the transmission mechanism being moved to reversing position.

From the foregoing, it will be seen that when the vehicle is being backed, a green light will appear at the rear thereof and the horn will be sounded so as to warn pedestrians and the drivers of other cars that the vehicle is to be reversed. Though the contacts 17 and 18 are placed in engagement with each other when the clutch pedal is in operative position, the circuit to the horn will not be closed until the switch A has been moved to closed position by the movement of the transmission means through the lever 4 to reverse position.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A signal for a vehicle comprising a lamp at the rear thereof, a circuit for the lamp, a double switch moved to closed position by the shift rod of the transmission mechanism when the same is in reverse position, one part of the switch being located in the circuit of the lamp, an alarm for the vehicle, a switch actuated by the clutch pedal, a conductor connecting one part of the switch with the other part of the first mentioned switch and a conductor connecting the second part of the second switch with the alarm, an auxiliary circuit for the alarm, and a switch in the auxiliary circuit for sounding the alarm when the vehicle is proceeding straight ahead and when the switch actuated by the clutch pedal is arranged in an open position.

In testimony whereof I affix my signature.

GLENN ROY MORRIS.